United States Patent
Cheng

(10) Patent No.: US 8,159,533 B2
(45) Date of Patent: Apr. 17, 2012

(54) SURVEILLANCE CAMERA CAPABLE OF RECORDING COLOR OR MONOCHROME IMAGES BASED ON TIME SETTINGS

(76) Inventor: Yi-Jen Cheng, Taichung (TW)

( * ) Notice: Subject to any disclaimer, the term of this patent is extended or adjusted under 35 U.S.C. 154(b) by 373 days.

(21) Appl. No.: 12/603,425

(22) Filed: Oct. 21, 2009

(65) Prior Publication Data

US 2011/0090335 A1    Apr. 21, 2011

(51) Int. Cl.
*H04N 5/225* (2006.01)
(52) U.S. Cl. ........................................ 348/143
(58) Field of Classification Search ............ 348/143; 359/353
See application file for complete search history.

(56) References Cited

U.S. PATENT DOCUMENTS

| | | | |
|---|---|---|---|
| 7,158,323 B2* | 1/2007 | Kim et al. | 359/892 |
| 7,633,529 B2* | 12/2009 | Park | 348/217.1 |
| 2005/0141117 A1* | 6/2005 | Kim et al. | 359/892 |
| 2011/0080479 A1* | 4/2011 | Trumbo et al. | 348/143 |

* cited by examiner

*Primary Examiner* — Moustafa M Meky
(74) *Attorney, Agent, or Firm* — patenttm.us

(57) ABSTRACT

A surveillance camera has a sensing module, a micro-control unit (MCU) and a real-time clock (RTC) unit. The sensing module records original images. The MCU is connected to the sensing module and stores multiple time settings and a smart timer process. The MCU executes the smart timer process to operate the surveillance camera in a color mode, a monochrome mode or an auto mode based on the time settings. In the color mode, the surveillance camera records color images. In the monochrome mode, the surveillance camera records monochrome images. In the auto mode, the surveillance camera selectively records color images and monochrome images based on a variation between light level of the original images and a predetermined light level. Therefore, the surveillance camera can be set to operate in specific mode based on requirements. The surveillance camera is more flexible and convenient than conventional surveillance cameras.

15 Claims, 2 Drawing Sheets

SURVEILLANCE CAMERA CAPABLE OF RECORDING COLOR OR MONOCHROME IMAGES BASED ON TIME SETTINGS

BACKGROUND OF THE INVENTION

1. Field of the Invention

The present invention relates to a surveillance camera, and more particularly to a surveillance camera that records color or monochrome images based on time settings.

2. Description of Related Art

Conventional surveillance cameras are used to record images, provide instant warnings or the like. In the daytime, the surveillance cameras record color images because of sufficient light level; but infrared (IR) light would cause surveillance cameras to have a color cast. Therefore, some surveillance cameras install an extra removable IR-cut filter to avoid the color cast during daytime. At night, the surveillance cameras record monochrome images and move over the IR-Cut filter to obtain clear images due to low light level conditions.

The conventional surveillance cameras record color or monochrome images by determining whether the light level around the conventional surveillance camera is sufficient. The conventional surveillance cameras record color images when the light level around the surveillance cameras is sufficient, and record monochrome images when the light level around the surveillance cameras is insufficient. However, in some circumstances, color images may be preferred despite low light level. Therefore, conventional surveillance cameras are inflexible and inconvenient.

To overcome the shortcomings, the present invention provides a surveillance camera that records color or monochrome images based on time settings to mitigate or obviate the aforementioned problems.

SUMMARY OF THE INVENTION

The main objective of the invention is to provide a surveillance camera that records color or monochrome images based on time settings.

The camera in accordance with the present invention comprises a sensing module, a micro-control unit (MCU) and a real-time clock (RTC) unit. The sensing module captures original images, transforms the original images into digital image signals, stores a predetermined light level and outputting a day signal or a night signal based on a variation between light level of the original images and the predetermined light level. The MCU is connected to the sensing module and stores multiple time settings and a smart timer process. The MCU executes the smart timer process to operate the surveillance camera in a color mode, a monochrome mode or an auto mode based on the time settings. When the surveillance camera operates in the color mode, the surveillance camera records color images. When the surveillance camera operates in the monochrome mode, the surveillance camera records monochrome images. When the surveillance camera operates in the auto mode, the surveillance camera selectively records color images and monochrome images based on light level around the surveillance camera. The RTC is connected to the MCU to provide timer pulses to the MCU so the MCU switches modes of the surveillance camera according to the time settings. Therefore, the surveillance camera of the present invention is flexible and convenient than conventional surveillance cameras.

Other objectives, advantages and novel features of the invention will become more apparent from the following detailed description when taken in conjunction with the accompanying drawings.

DETAILED DESCRIPTION OF PREFERRED EMBODIMENT

Figure 1:
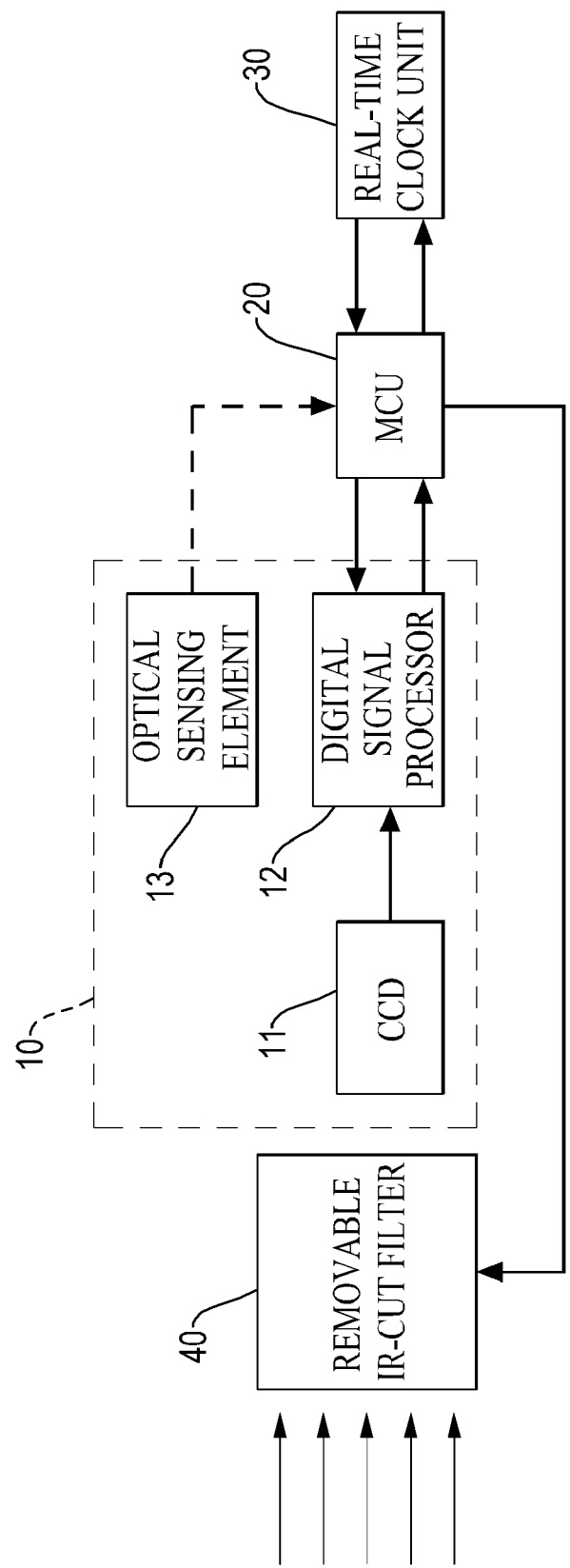
FIG. 1 is a functional block diagram of a surveillance camera in accordance with the present invention.

With reference to FIG. 1, a surveillance camera comprises a sensing module (10), a micro-control unit (MCU) (20), a real-time clock (RTC) unit (30) and a removable infrared ray cut filter (IR cut filter) (40).

The sensing module (10) has an image input. The image input captures original images and the sensing module (10) transforms the original images into digital image signals. The sensing module (10) stores a predetermined light level and outputs a day signal or a night signal according to a variation between light level of the original images and the predetermined light level. For example, when the light level of the original images is varied from lower than the predetermined light level to higher than the predetermined light level, the sensing module (10) outputs a day signal. Otherwise, the sensing module (10) outputs a night signal. Further, in a first embodiment, the sensing module (10) may comprise a charge-coupled device (CCD) (11) and a digital signal processor (12). The CCD (11) captures the original images and transforms the original images into digital image signals. The digital signal processor (12) is connected to the CCD (11) and analyzes the light level of the original images to output the day signal or the night signal. Additionally, in a second embodiment, the sensing module (10) may comprise a charge-coupled device (CCD) (11) and a digital signal processor (12) and further comprise an optical sensing element (13). The digital signal processor (12) is connected to the CCD (11) and is in charge of outputting the day signal or the night signal. The optical sensing element (13) is connected to the digital signal processor (12) and the MCU (20), analyzes the light level around the surveillance camera and outputs the day signal or the night signal.

Figure 2:
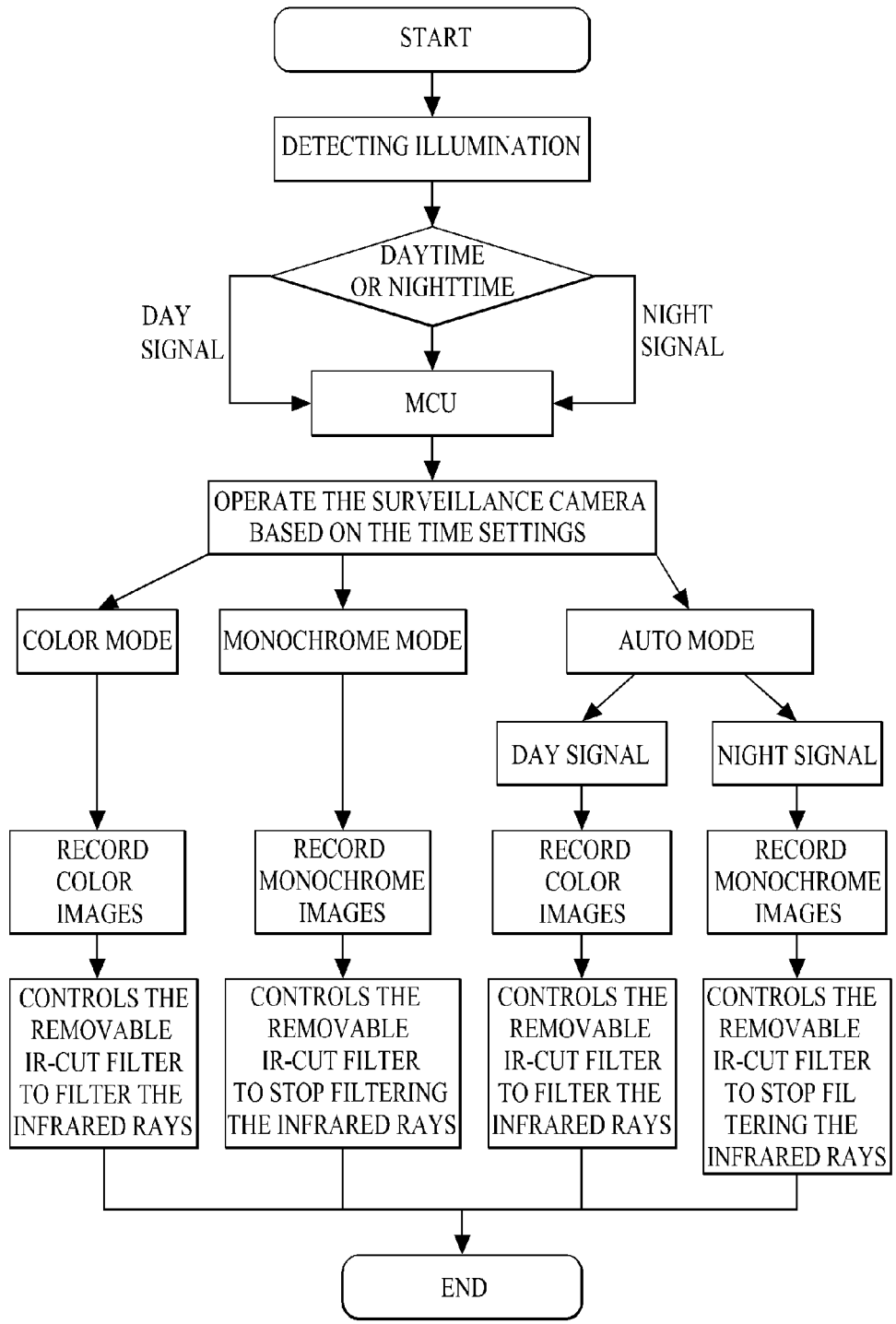
FIG. 2 is a flow chart of operation of the surveillance camera in accordance with the present invention.

The MCU (20) is connected to the sensing module (10) and stores multiple time settings and a smart timer process. The MCU (20) executes the smart timer process to operate the surveillance camera in a color mode, a monochrome mode or an auto mode based on the time settings. With further reference to FIG. 2, when the surveillance camera operates in the color mode, the surveillance camera records color images. When the surveillance camera operates in the monochrome mode, the surveillance camera records monochrome images. When the surveillance camera operates in the auto mode, the surveillance camera records color images or monochrome images based on the day signal or the night signal output from the sensing module (10).

For example, one of the time settings is to operate the surveillance camera in color mode from 5 p.m. to 6 a.m. The MCU (20) executes the smart timer process to operate the surveillance camera in the color mode from 5 p.m. to 6 a.m. The surveillance camera will then operate in color mode and not switch to record monochrome images when the light level around the surveillance camera is insufficient so the surveillance camera will record color images from 5 p.m. to day 6 a.m. Further customized timings of smaller or larger increments are also possible, according to type of business, location of the camera and the like.

The RTC chip (30) is connected to the MCU (20) to provide exact time pulses to the MCU (20) so the MCU (20) accurately switches modes of the surveillance camera according to the time settings.

The removable IR cut filter (40) is mounted beside the image input of the sensing module (10) to selectively filter infrared rays. The removable IR cut filter (40) may operate manually or non-manually. When the removable IR cut filter (40) operates non-manually, the removable IR cut filter (40) is connected to the MCU (20). The MCU (20) controls the removable IR cut filter (40) to filter the infrared rays when the surveillance camera records color images and stop filtering the infrared rays when the surveillance camera records monochrome images.

Based on the foregoing descriptions, the smart timer process in the MCU (20) enables the surveillance camera to operate in the color mode, monochrome mode or auto mode based on the time settings. Therefore, surveillance cameras of the present invention are more flexible and convenient to use than conventional surveillance cameras.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A surveillance camera capable of recording color or monochrome images based on time settings comprising:
   a sensing module having an image input to capture original images, and the sensing module transforming the original images into digital image signals, storing a predetermined light level and outputting a day signal or a night signal according to a variation between light level of the original images and the predetermined light level;
   a micro-control unit (MCU) connected to the sensing module and storing multiple time settings and a smart timer process, and the MCU executing the smart timer process to operate the surveillance camera in a color mode, a monochrome mode or an auto mode based on the time settings, wherein the surveillance camera records color images in the color mode, records monochrome images in the monochrome mode, and records color images or monochrome images based on the day signal or the night signal in the auto mode; and
   a real-time clock (RTC) unit connected to the MCU to provide timer pulses to the MCU so the MCU switches modes of the surveillance camera according to the time settings.

2. The camera as claimed in claim 1, wherein the sensing module further comprises:
   a charge-coupled device (CCD) capturing the original images and transforming the original images into digital image signals; and
   a digital signal processor connected to the CCD and the MCU and analyzing the light level of the original images to output the day signal or the night signal.

3. The camera as claimed in claim 2 further comprising a removable IR cut filter, wherein the removable IR cut filter is mounted beside the image input of the sensing module to selectively filter infrared rays.

4. The camera as claimed in claim 3, wherein the removable IR cut filter filters the infrared rays when the surveillance camera records color images and stops filtering the infrared rays when the surveillance camera records monochrome images.

5. The camera as claimed in claim 4, wherein the removable IR cut filter is connected to the MCU and is controlled to selectively filter infrared rays by the MCU.

6. The camera as claimed in claim 3, wherein the removable IR cut filter is connected to the MCU and is controlled to selectively filter infrared rays by the MCU.

7. The camera as claimed in claim 1, wherein the sensing module further comprises:
   a CCD capturing the original images and transforming the original images into digital image signals;
   a digital signal processor connected to the CCD and the MCU; and
   an optical sensing element connected to the MCU, analyzing the light level around the surveillance camera and outputting the day signal or the night signal.

8. The camera as claimed in claim 7 further comprising a removable IR cut filter, wherein the removable IR cut filter is mounted beside the image input of the sensing module to selectively filter infrared rays.

9. The camera as claimed in claim 8, wherein the removable IR cut filter filters the infrared rays when the surveillance camera records color images and stops filtering the infrared rays when the surveillance camera records monochrome images.

10. The camera as claimed in claim 9, wherein the removable IR cut filter is connected to the MCU and is controlled to selectively filter infrared rays by the MCU.

11. The camera as claimed in claim 8, wherein the removable IR cut filter is connected to the MCU and is controlled to selectively filter infrared rays by the MCU.

12. The camera as claimed in claim 1 further comprising a removable infrared ray cut filter (IR cut filter), wherein the removable IR cut filter is mounted beside the image input of the sensing module to selectively filter infrared rays.

13. The camera as claimed in claim 12, wherein the removable IR cut filter filters the infrared rays when the surveillance camera records color images and stops filtering the infrared rays when the surveillance camera records monochrome images.

14. The camera as claimed in claim 13, wherein the removable IR cut filter is connected to the MCU and is controlled to selectively filter infrared rays by the MCU.

15. The camera as claimed in claim 12, wherein the removable IR cut filter is connected to the MCU and is controlled to selectively filter infrared rays by the MCU.

* * * * *